UNITED STATES PATENT OFFICE.

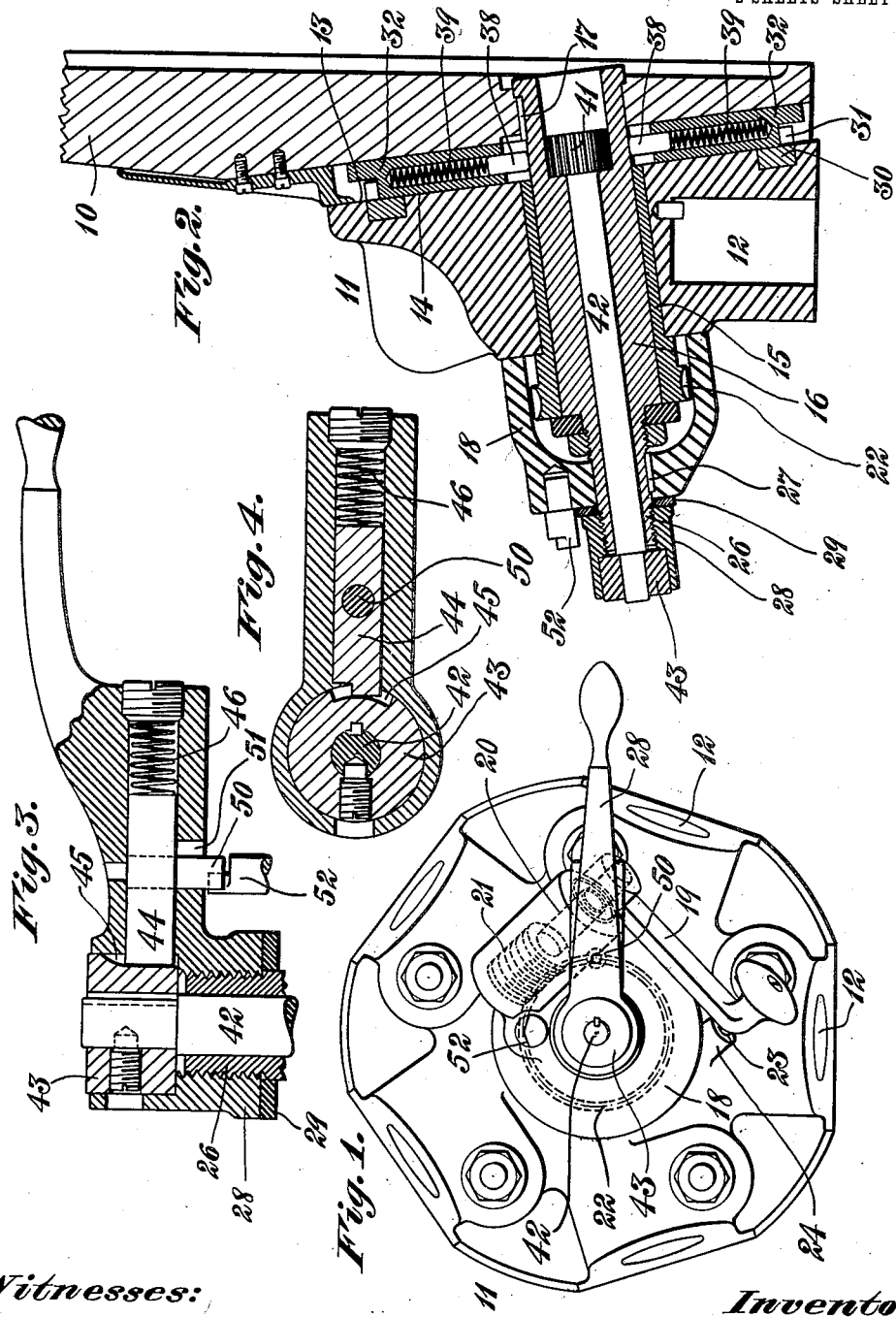

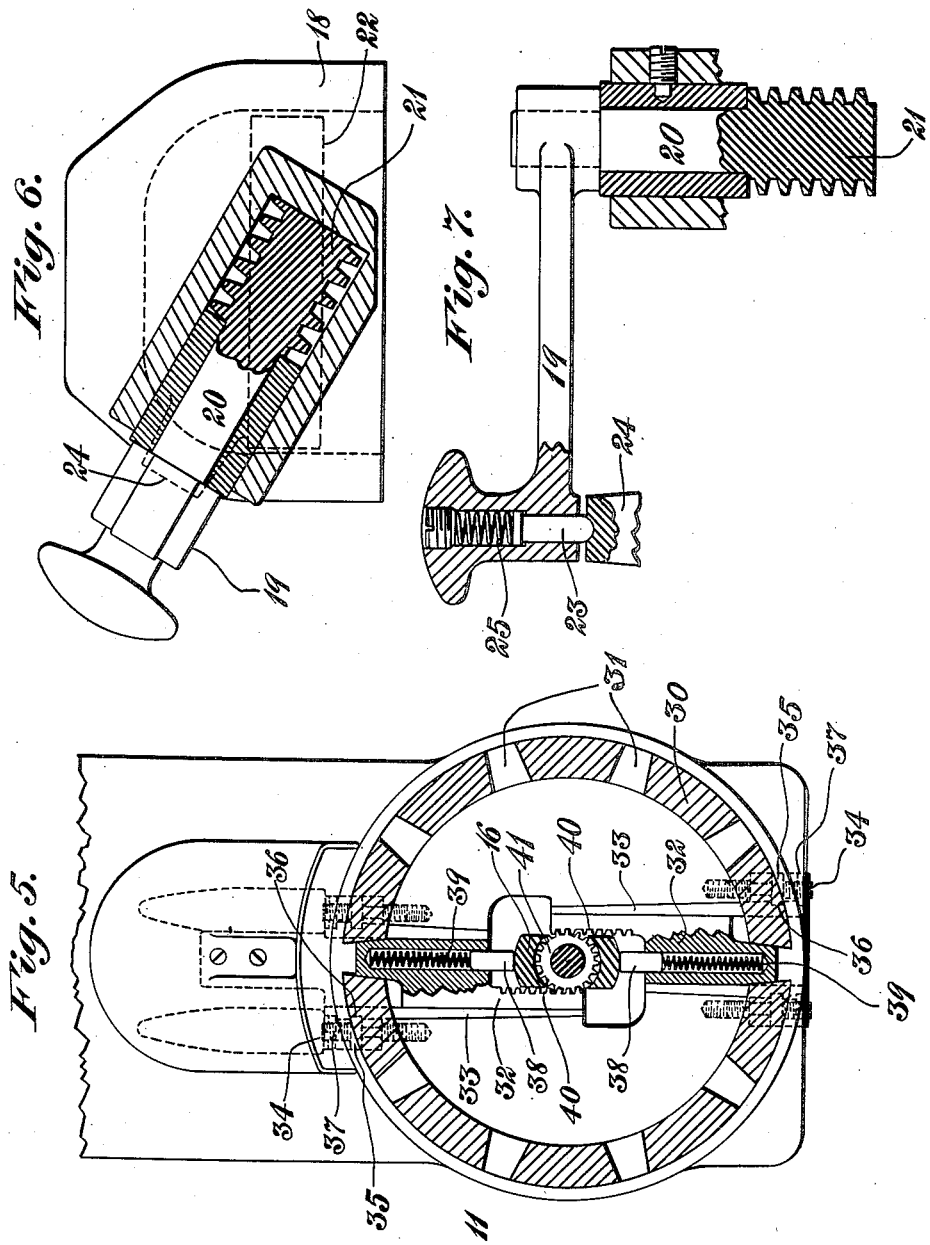

BENGT M. W. HANSON AND EMANUEL HENRIKSON, OF HARTFORD, CONNECTICUT, ASSIGNORS TO PRATT & WHITNEY COMPANY, OF HARTFORD, CONNECTICUT, A CORPORATION OF NEW JERSEY.

TURRET INDEXING AND LOCKING MECHANISM.

1,042,001.  Specification of Letters Patent.  Patented Oct. 22, 1912.

Application filed November 9, 1911. Serial No. 659,355.

*To all whom it may concern:*

Be it known that we, BENGT M. W. HANSON and EMANUEL HENRIKSON, citizens of the United States, residing at Hartford, in the county of Hartford and State of Connecticut, have invented certain new and useful Improvements in Turret Indexing and Locking Mechanisms, of which the following is a specification.

This invention relates to turret indexing and locking mechanism, the object of the invention being to provide effective means of this character by which a turret can be accurately indexed and by which it can be rigidly and substantially held in its indexed position.

In the drawings accompanying and forming part of the present specification we have shown in detail one convenient form of embodiment of the invention which to enable those skilled in the art to practise the same will be set forth fully in the following description, while the novelty of the invention will be included in the claims succeeding said description. From this statement it will be clear that we do not restrict ourselves to the showing made by said drawings and description; we may depart therefrom in several respects within the scope of our invention covered in said claims.

Referring to said drawings: Figure 1 is a face view of a turret equipped with locking and indexing mechanism involving our invention. Fig. 2 is a cross section of said turret and the slide supporting the same. Fig. 3 is a sectional view partly in elevation of an operating lever, portion of the spindle and certain coöperating devices. Fig. 4 is a sectional view of the inner end of said lever and parts shown in Fig. 1, the section of Fig. 4 being at right angles to that of Fig. 3. Fig. 5 is a vertical sectional view of the turret, with parts broken away, the slide being shown in elevation. Fig. 6 is a view of a cap member and an operating shaft carried thereby. Fig. 7 is a sectional elevation of the worm shaft and hand lever shown in Fig. 6.

Like characters refer to like parts throughout the several views which it will be perceived are on different scales.

While we do not restrict our locking and indexing mechanism to incorporation in any particular type of turret, the turret is shown as being vertically disposed, being sustained for rotation by a slide 10 which has a vertical movement upon ways on a column or like support carried on the bed or other suitable part of the lathe, said column or its equivalent not being illustrated as the invention does not concern the same. The turret is denoted in a general way by 11 and it has several radial tool receiving sockets 12. The slide 10 has a flat bearing surface 13 to receive the corresponding bearing surface 14 upon the inner side of the turret, the two surfaces being at a slant or angle to the vertical so that the tool in use will stand vertical, while the tools not in use will be at upward outward inclination. This construction, however, is not uncommon in turret lathes, and it is, therefore, needless for us to further describe the same.

The turret 11 has a central hole to receive the sleeve 15, the two parts being usually keyed together so that when the sleeve is turned the turret will be turned therewith, and as will hereinafter appear this sleeve 15 is rotated by gearing for the purpose of indexing the turret.

The pivot for the turret is denoted by 16, and it extends through the sleeve 15 and finds a bearing in the slide 10, said pivot or journal 16 being keyed or otherwise suitably non-rotatively connected with the slide 10. For this purpose I have shown a key 17 which fits seats in the inner end of the pivot or journal 16 and wall of the opening in which said inner end fits. The sleeve 15 therefore turns upon the journal or pivot 16.

Inclosing the outer end of the sleeve 15 is the cap 18, and this cap constitutes a suitable support for an actuator or operating device as 19 which may as illustrated consist of a lever or handle fastened as by pins or otherwise to the shaft 20 rotatively mounted in a bearing in said cap 18. The shaft 20 has rigid therewith the worm 21 in mesh with the worm gear 22 at the outer end of the sleeve 15; in the construction shown the worm gear 22 is integral with the sleeve 15, although this is not essential, nor is it necessary that worm gearing be provided for turning the sleeve 15 and therefore the turret 11. Worm gearing for this purpose is, however, advantageous in that it is self-locking. The lever or handle 19 is provided at its outer end with a spring detent or plunger 23 normally fitting a seat in the boss 24 on the cap 18, the pressure of the spring 25 of said plunger or detent being sufficient to prevent accidental movement of the handle or lever 19 but not enough to prevent free movement of said lever by hand when it is desired to rotate the turret 11. The parts are so proportioned in the present case that one full revolution of the lever 19 will through the intermediate parts, rotate the turret 11 one step or a distance corresponding to that between the centers of two adjacent sockets 12. It will be clear that when the lever 19 is swung around in the manner described, the shaft 20 will be rotated, and the worm 21 thereof being in mesh with the worm gear 22, the sleeve 15 and hence the turret 11 will be rotated.

The outer reduced portion 26 of the journal or pivot 16 extends through an opening in the cap 18 and is preferably though not necessarily keyed to said cap as at 27. The hub of the operating lever 28 is threaded onto the extreme outer end of said reduced portion 26 and between the interiorly threaded hub and the cap 18 a washer 29 is interposed. This operating lever 28 clamps the turret 11 to the slide 10 and in addition is provided with means for operating the turret-locking means as will hereinafter appear. It will be clear that when said operating lever 28 is swung in one direction its hub will act to clamp or force the turret 11 solidly against the slide or bring the flat surface 14 substantially against the coöperating surface 13 to thereby aid in preventing accidental rotation of the turret, the absolute prevention of such accidental motion being positively insured by one or more locking bolts as will hereinafter appear. By swinging the operating lever 28 in the opposite direction the surface 14 may be freed from engagement with the surface 13, by reason of which the turret can be indexed, which function is accomplished through the operation of the lever 19 in the manner already described.

Set into an annular groove or channel in the inner face of the turret 11 is a ring 30, and this ring has several notches as 31, two diametrically opposite ones of which are adapted to receive the tips or working ends of bolts as 32 which in the construction shown slide radially of the said turret. It will be seen therefore that the turret is locked at diametrically opposite sides of its center of rotation, by reason of which shake or chattering during cutting is reduced to the least possible extent. While the keeper notches or seats for the bolts are formed in a ring separate from the turret itself, this is not essential. It will, of course, be understood that this ring 30 is driven or fitted solidly in its receiving groove in the turret.

The slide 10 has ways to receive the two bolts 32 and wear in the same is taken up by gibs 33 which overlie the respective bolts. Tapped into the slide are screws 34 provided between their ends with rigid collars 35 fitting notches 36 in the adjacent faces of the respective gibs 33 so that by turning the screws 34 the gibs can through said collars 35, be adjusted to compensate for wear and when the adjustment has been secured, it will be maintained by nuts as 37 fitted to the respective screws and which may be moved into engagement with the outer ends of the coöperating gibs. The bodies of the two bolts 32 are bored to receive spring plungers 38 the inner ends of which bear against the outer surface of the journal or pivot 16, the springs 39 which fit said bores pressing said plungers against said journal and also constantly forcing the bolts 32 outward. Each bolt 32 is shown having rack teeth 40, said rack teeth or racks in the construction shown meshing with a pinion 41 which is rigidly connected with the inner end of the shaft 42, extending through and turning in an opening in the journal 16 and provided with a rigid collar 43 at its outer end. It will be understood that when the shaft 42 is turned in one direction, the two bolts 32 will be simultaneously drawn inward to unlock the turret whereby the latter can be turned as already described. The collar 43 is fitted for free movement in a chamber or cavity in the hub of the operating lever 28, said lever being provided with means for operating said shaft 42 through the agency of said collar 43, and although said means may vary, that now to be described is advantageous. I might state at this point that the mechanism for effecting the action of the shaft 42 has a lost or ineffective motion, and during this lost motion or ineffective movement, the lever 28 is being operated to unclamp the turret 11. After the turret is unclamped, the bolts 32 through the appropriate parts will be operated to unlock said turret.

The operating lever 28 is provided near its hub with a spring pawl or dog 44, the tip or inner end of which is normally seated in a notch 45 in the collar 43, the spring of said pawl being denoted by 46 and serving to constantly hold the tip or toothed end of said plunger 44 in said notch 45. The length of the circumferential notch 45 is such that the lever 28 can be first moved to turret unclamping position, and when this position has been reached the tooth of the pawl or dog 44 will be carried against one of the walls of the notch or slot 45 so that on the continued movement of the lever 28 the collar 43 can be rotated to effect the rotation of the shaft 42 and through the described parts, the withdrawal or retraction of the locking bolts 32. The pawl or dog 44 is shown provided with a pin 50 which extends through a longitudinal slot 51 in the body of the lever 28, and this pin or projection 50 coöperates with a trip device 52 which may as shown consist of a stud on the cap 18. The lever 28 will have a swing sufficient to carry the projection or pin 50 against the trip device 52, to thereby draw the pawl or dog 44 backward as said lever is swung by the operator, and disengage said pawl from the collar 43 whereby the bolts 32 will be released; this should take place preferably before the turret has reached its shifted position. In use, therefore, the operator will first swing the lever 28 a distance sufficient to clear the lever 19 but not enough to effect the tripping of the pawl 44, for instance the lever 28 can be shifted until the pin 50 has practically engaged the stud 52 at which point the lever 19 can be freely swung around. On the initial movement of said lever 19 the lever 28 can be operated to cause the trip device 52 to withdraw the pawl 44 in the manner described and hence release the two locking bolts 32 so that when the turret is turned to the desired position, the bolts will then be in readiness to be sprung into the appropriate notches 31 by the power of the two springs 39. It should be noted that the worm shaft 20 is between the lever 28 and the body of the turret 11 and that said worm shaft stands at an inclination so that when the worm shaft is at rest the lever 28 can be freely operated.

It will be assumed that the turret is in a clamped and indexed position and that it is desired to change the relation. In this event the lever 28 is first manipulated. On the initial movement of said lever the turret 11 is unclamped as already described and thereafter the locking bolts 32 are drawn back as described. When the turret is thus freed the lever 28 will be out of the range of action of the lever 19 so that said lever can be given one complete revolution during which the turret will be rotated one step. If a greater movement of the turret is desired, of course, it will be necessary to correspondingly operate the lever 19.

What we claim is:

1. In a machine of the class described, the combination of a turret, a pair of locking bolts for the turret each having rack teeth, a rotary pinion in mesh with the rack teeth and adapted when rotated to retract said bolts, and spring means acting against the bolts and tending constantly to advance the same.

2. In a machine of the class described, the combination of a turret and a pivot therefor, a locking bolt for said turret, a rotary shaft extending through said pivot, and a pinion rigid with said shaft, said bolt having rack teeth in mesh with said pinion whereby when the shaft is turned, the bolt will be operated.

3. In a machine of the class described, the combination of a turret and a pivot therefor, a locking bolt for the turret, a rotary shaft extending through said pivot and provided with means for retracting said locking bolt, a lever loosely connected with said pivot, for clamping the turret to its support, and a pawl carried by the lever, said shaft having a device operable by the pawl after the lever on its movement has unclamped the turret.

4. In a machine of the class described, the combination of a turret and a pivot therefor, a locking bolt for the turret, a rotary shaft extending through said pivot, and provided with means for retracting said locking bolt, a lever loosely connected with said pivot, for clamping the turret to its support, a pawl carried by the lever, said shaft having a device operable by the pawl after the lever on its movement has unclamped the turret, and means for tripping said pawl when said lever has made a predetermined movement.

5. In a machine of the class described, the combination of a turret and a pivot for the turret, a locking bolt for said turret, a rotary shaft extending through the pivot and provided with means for retracting said locking bolt, a lever freely carried by the pivot and adapted to clamp the turret to its support, said shaft extending through the hub of said lever, a collar rigid with said shaft, a spring operated pawl carried by the lever, said collar having a notch to receive the tip of the pawl and means for tripping said pawl when said lever has made a predetermined movement.

6. In a machine of the class described, the combination of a turret and a pivot therefor, a locking bolt for the turret, a rotary shaft extending through said pivot and provided with means for retracting said locking bolt, a movable member provided with means for clamping said turret to its support, and means for transferring the effect of said movable member to said shaft for retracting said locking bolt, after the turret has been unclamped.

7. In a machine of the class described, the combination of a turret and a pivot therefor, a locking bolt for the turret, a rotary shaft extending through said pivot and provided with means at its inner end for retracting said locking bolt, a lever coaxial with said pivot, for clamping the turret to its support, and means operative by said lever after the same has unclamped the turret, for turning said shaft to effect the retraction of said locking bolt.

8. In a machine of the class described, the combination of a turret and a pivot therefor, a clamping lever for the turret, freely carried by said pivot, an inclined shaft supported by the turret between said lever and the body of said turret, and means connected with said inclined shaft for turning the turret.

9. In a machine of the class described, the combination of a turret, a relatively stationary pivot for said turret, a sleeve fitted in and rigid with the turret and surrounding said pivot, said sleeve having a worm gear, and a rotary shaft provided with a worm in mesh with said worm gear, the turret having means for supporting said rotary shaft.

In testimony whereof we affix our signatures in presence of two witnesses.

BENGT M. W. HANSON.
EMANUEL HENRIKSON.

Witnesses:
W. M. STORRS,
F. E. ANDERSON.